Dec. 2, 1941.　　　　　A. J. DEVLIN　　　　　2,264,302
PRECISION GRINDING MACHINE
Filed May 8, 1940　　　　8 Sheets-Sheet 1

INVENTOR
A. J. Devlin
BY
W. Glenn Jones
ATTORNEY

Dec. 2, 1941.        A. J. DEVLIN        2,264,302
PRECISION GRINDING MACHINE
Filed May 8, 1940        8 Sheets-Sheet 2

Fig. 2.

INVENTOR
A. J. Devlin
BY
W. Glenn Jones
ATTORNEY

Dec. 2, 1941.  A. J. DEVLIN  2,264,302
PRECISION GRINDING MACHINE
Filed May 8, 1940  8 Sheets-Sheet 3

*Fig. 3.*

INVENTOR
*A. J. Devlin*
BY
ATTORNEY

Dec. 2, 1941.    A. J. DEVLIN    2,264,302
PRECISION GRINDING MACHINE
Filed May 8, 1940    8 Sheets-Sheet 4

Fig. 4.

INVENTOR
A. J. Devlin
BY
ATTORNEY

Dec. 2, 1941.　　　A. J. DEVLIN　　　2,264,302
PRECISION GRINDING MACHINE
Filed May 8, 1940　　　8 Sheets-Sheet 6

Fig. 6.

INVENTOR
A. J. Devlin
BY
ATTORNEY

Fig. 9

Patented Dec. 2, 1941

2,264,302

UNITED STATES PATENT OFFICE 2,264,302

PRECISION GRINDING MACHINE

Arthur J. Devlin, Washington, D. C.

Application May 8, 1940, Serial No. 333,994

15 Claims. (Cl. 51—95)

(Granted under the act of March 3, 1883, as amended April 30, 1928; 370 O. G. 757)

This invention relates to a grinding machine and more particularly to a machine for grinding the edges of optical lenses to reduce such lenses accurately to a predetermined size, that will automatically stop the grinding when such size is reached.

Among the several objects of this invention are:

To provide, in a machine having a reciprocating carriage, a novel anti-friction guideway for the carriage, that gives accurate straight line motion to the carriage over long periods of use;

To provide a travelling nut drive for a reciprocating carriage which prevents lost motion between the carriage and the nut yet applies no stress to the carriage in the event of departure of the body of the driving screw from a true rectilinear condition;

To provide automatic means to stop the grinding at a predetermined diameter of the piece being worked upon, which means is jointly controlled by the linear travel of the carriage and by the rotation of the feed screw that moves the carriage;

To provide a machine as described that requires no attention of the operator between the initiation of the grinding and the completion of the grinding to the size for which the machine is set; and To provide a machine for grinding simultaneously a plurality of lenses of the same size.

Figure 2:
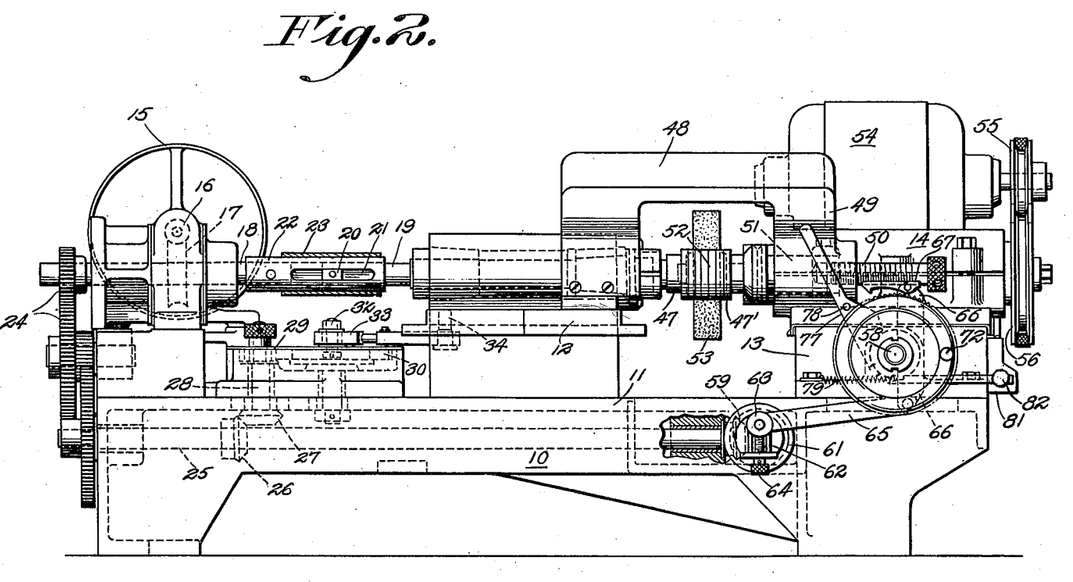
Fig. 2 is a transverse sectional elevation on the line 3—3, Fig. 5, looking in the direction of the arrow and showing the travelling nut for driving the grinding wheel carriage and my novel precision anti-friction guideways.

Referring now to the drawings, it will be seen in Fig. 2 that my machine comprises a base 10 supporting a bed 11 for the work-holding spindle carriage 12 and a bed 13 at right angles thereto for the grinding wheel carriage 14. A motor 15 drives the worm 16 meshed with the worm gear wheel 17 mounted on a shaft 18 whereby the work-piece holding spindle 19 is driven. The spindle 19 is connected to the shaft 18 by means of a crosshead 20 fixed on spindle 19 that is slidable in the longitudinal slot 21 formed in a sleeve 22 fixed to shaft 18, whereby the spindle 19 is positively driven and simultaneous reciprocation of the carriage 12 is permitted.

A boot 23 is fitted around sleeve 22 to exclude dirt and grit from the slot 21.

The train 24 of reducing gears drives a shaft 25 whereon is keyed a beveled pinion 26 meshed with another beveled pinion 27 fixed on a shaft 28 that has the pinion 29 fixed thereon. A gear 30 is meshed with pinion 29 and has in its upper face a diametral slot 31 in which a crank pin 32 is adjustable. The link 33 is pivoted at one end on the crank pin 32 and at its other end is pivotally connected to a pin 34 fixed to carriage 12 whereby rotation of the gear 30 reciprocates the carriage 12. It is obvious that the travel of carriage 12 may be adjusted by moving crank pin 32 closer to or farther from the axis of rotation of the gear 30.

Figure 3:
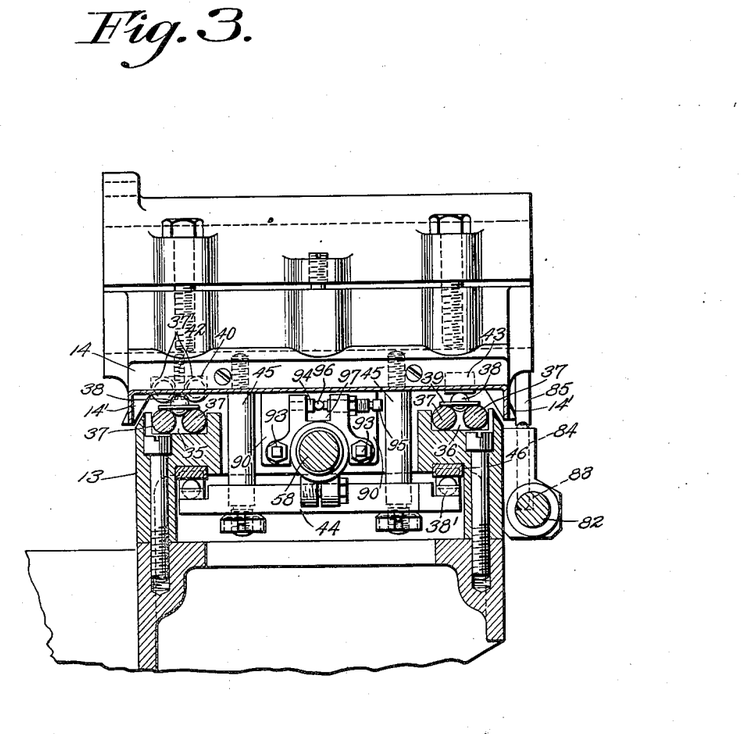
Fig. 3 is a sectional view taken transversely of the feed screw, substantially on the line 3—3, Fig. 6.
Figure 4:
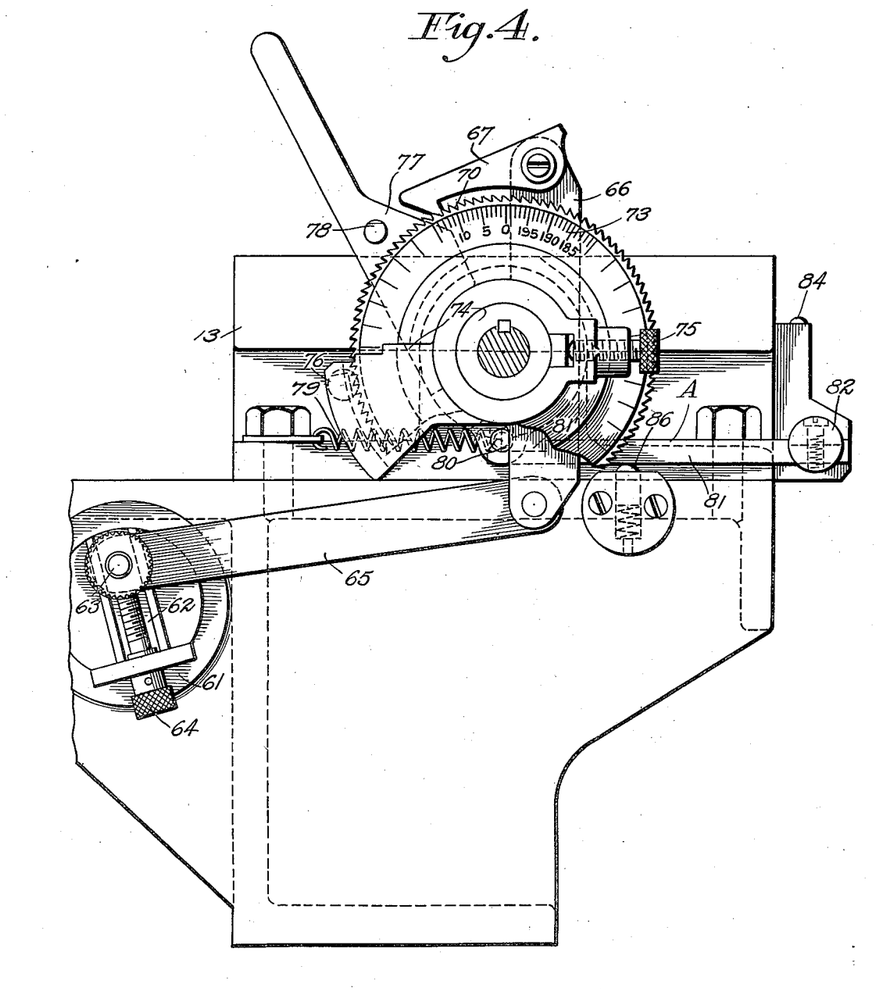
Fig. 4 is an enlarged detailed elevation of the means for driving the feed screw.
Figure 7:
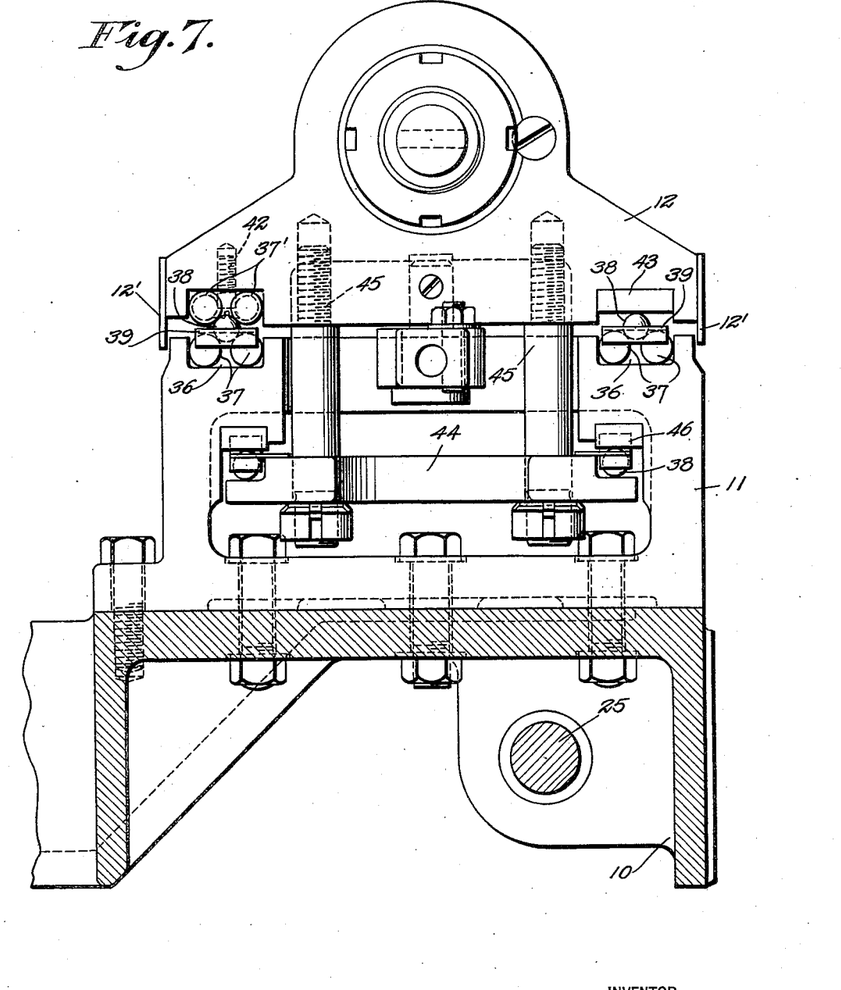
Fig. 7 is an end elevation view of the carriage for the work-piece holding spindle.

It is essential that the carriage 12 have a true rectilinear travel along the same line over long periods of use. To insure this, I have devised the novel anti-friction precision guideways that will now be described in connection with Fig. 3. While Fig. 3 shows the structure connected with the grinding wheel carriage 14, it is to be understood that the anti-friction guideways are identical in both carriages 12 and 14, the former being shown in Fig. 7 where corresponding parts have the same reference characters as in Fig. 3.

Figure 9:
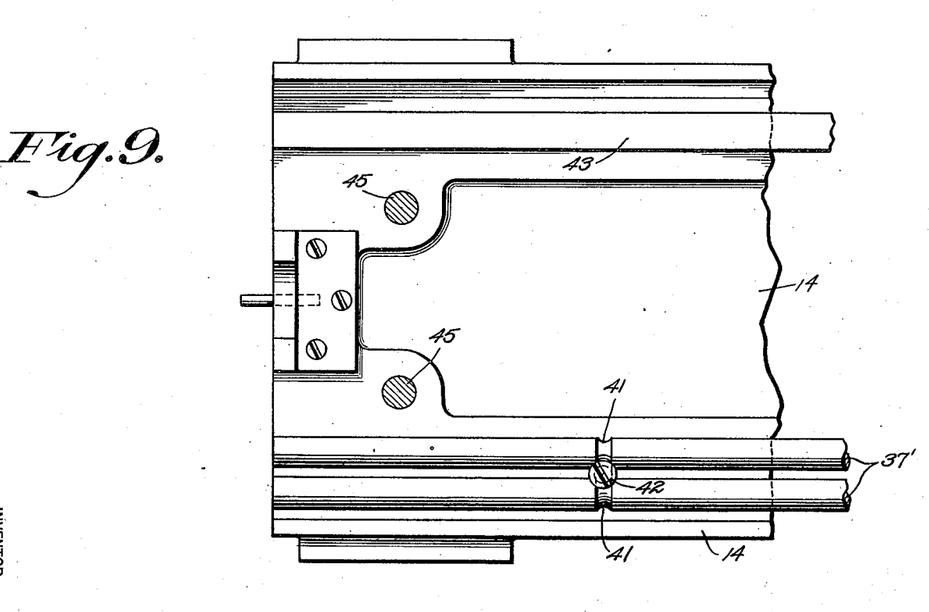
Fig. 9 is a bottom plan view of a portion of the grinding wheel carriage.

The bed 13 has formed in it two upwardly facing channels 35 and 36 in each of which channels is disposed a pair of accurately cylindrical hardened rods 37 slightly spaced from and accurately parallel to each other. A plurality of hardened balls 38 is disposed between the rods 37, the several balls being kept spaced from each other by a member 39, there being a group of spaced balls at each end of member 39. The purpose of spacing the balls 38 is to prevent the balls from rolling into contact with one another and thus setting up unnecessary friction. One side of the carriage 14 has formed in it a channel 40 wherein are disposed a pair of accurately cylindrical hardened rods 37' so disposed that when the carriage 14 is assembled on bed 13 the balls 38 will ride between the rods 37'. As is shown in Fig. 9, the rods 37' have circumferential grooves 41 formed therein to receive a screw 42 whereby the rods 37' are secured in carriage 14, the grooves permitting the head of screw 42 to be kept out of contact with the balls 38. At the other side of carriage 14 a removable hardened track member 43 is inserted in carriage 14 to ride upon the balls 38. A skirt 14' at each side prevents access of dirt to the guideways.

Rising of carriage 14 is prevented by the holding-down members 44 secured to carriage 14 by threaded studs 45. Hold-down piece 44 has hardened track portions upon which the balls 38' roll, the upper sides of the balls bearing against hardened track portions 46 set in bed 13. It is thus apparent that my novel guideways provide substantially frictionless support for the reciprocating carriage and cause the carriage to move along a true rectilinear path. The rods 37 and 37' may be rotated a few degrees about their longitudinal axes to compensate for any wear which may occur and thus provide a large number of fresh supporting surfaces. The balls 38 are carefully chosen in sets of accurately identical size.

The work-piece is attached to spindle 19 by any form of chuck 47 well known in the art. However, I have provided the means for grinding simultaneously several lenses of the same size. Bracket 48 is fixed at one end to carriage 12 and has at its other end a down-turned portion 49 wherein a second chuck 47' is suitably mounted against anti-friction thrust bearings (not shown). A screw 50 is threaded in the portion 49 and bears against a member 51 that carries the thrust bearings. A plurality of lenses 52 are held between the chuck 47 and 47' to be operated upon by the abrasive wheel 53.

The abrasive wheel 53 is rotatably mounted on carriage 14 and is driven by a motor 54, likewise mounted on carriage 14, through the pulleys 55 and 56 connected by belt 57. Carriage 14 is traversed on bed 13 by means of a feed screw 58 mounted in bed 13 to be freely rotatable but to prevent longitudinal movement of the screw. The shaft 25 carries a beveled pinion 59 meshed with a beveled pinion 60 secured on the same shaft as a disk 61 which has in its face a slot 62 wherein a crank pin 63 is slidably mounted and is adjustable by means of a screw 64. A link 65 is connected at one end to crank pin 63 and at its other end to a feed lever 66 that is mounted to oscillate about the axis of feed screw 58 and carries at its upper end two feed pawls 67 and 68.

Secured on feed screws 58 is a driving disk 69 having on its periphery a plurality of accurately spaced ratchet teeth 70. In one embodiment of this machine as constructed the pitch of the feed screw is 2 mm. and there are 200 of the ratchet teeth 70 on disk 69 and thus rotation of the disk through the angular distance subtended by the length of the arc between two of the teeth 70 moves carriage 14 through a distance of 1/200 of 2 mm. It is apparent that this provides a very fine control of the traverse of carriage 14 on bed 13. A hand wheel 71 with a handle 72 is fixed on feed screw 58 to provide for manual operation of the feed screw for setting the same.

A dial 73, graduated in 200 parts corresponding to the ratchet teeth 70 is fixed to the ratchet wheel 69. The feed stop arm 74 is, by means of a screw 75, adjustably fixed on the axially elongated hub of disk 69 and has a portion 76 extending over the edge of the periphery of disk 69 to lift feed pawl 67 out of engagement with teeth 70 at a predetermined angular position of the disk 69, the disengaging of the pawl 67 being determined by the graduation on dial 73 corresponding to the setting of portion 76. It is apparent that the disengagement of pawl 67 will not by itself arrest the actuation of feed screw 58 because the pawl 68 will continue to actuate the ratchet wheel 69. The purpose of this construction is to permit the machine to operate through more than one complete rotation of the feed screw 58.

The kick-out arm 77 is mounted to oscillate about the axis of feed screw 58 and carries a pin 78 that extends over the edge of the periphery of ratchet wheel 69 to disengage pawl 68 under conditions that will be hereinafter described. A contractile spring 79 has one end fixed and the other end attached to a pin 80 carried by kick-out arm 77 and tends to move the arm 77 back toward the pawl 68. During operation the kick-out arm 77 is held away from pawl 68 through engagement of the pin 80 in a notch 81' in latch 81 which is secured on a shaft 82 that is rockably mounted on bed 13. In shaft 82 there is formed a recess 83 that is laterally offset from the axis of shaft 82 and in which one end of pin 84 is seated. An adjustable dog 85 is fixed to carriage 14 and at the desired point in the traverse of carriage 14 it contacts pin 84 and rocks shaft 82 to disengage latch 81 from pin 80, against the effort of spring pressed plunger 86 that tends to hold latch 81 engaged with pin 80. When latch 81 is so disengaged kick-out arm 77 is rocked back by spring 79 and pin 78 lifts pawl 68 out of engagement with teeth 70 and retains pawl 68 disengaged until the arm 77 is manually reset. It is apparent that after pawl 68 has been thus disengaged at the predetermined point in the travel of carriage 14, when feed stop arm 74 next disengages pawl 67 from teeth 70, the actuation of feed screw 58 will be arrested. A fixed index 101 provides a reference point for setting the feed stop arm 74.

It frequently occurs that a feed screw, such as screw 58, becomes deformed so that the axis thereof is not a true straight line and in such cases the travelling nut driven by the screw is given a movement transversely of the axis of the screw. If the travelling nut is rigidly connected to the carriage propelled thereby, stresses are applied to the carriage that result in strains in or breakage of parts thereof, the guideways are worn excessively and both the screw and the travelling nut may be damaged. The form of travelling nut next to be described eliminates the above-mentioned bad effects.

Figure 5:
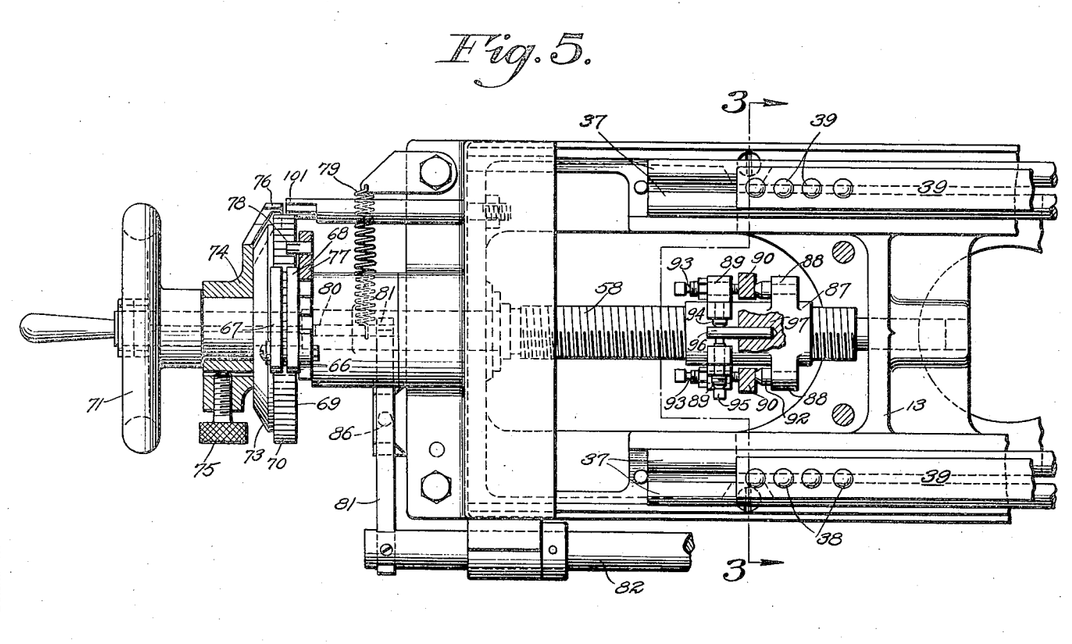
Fig. 5 is a top plan view of the bed for the grinding wheel carriage.
Figure 6:
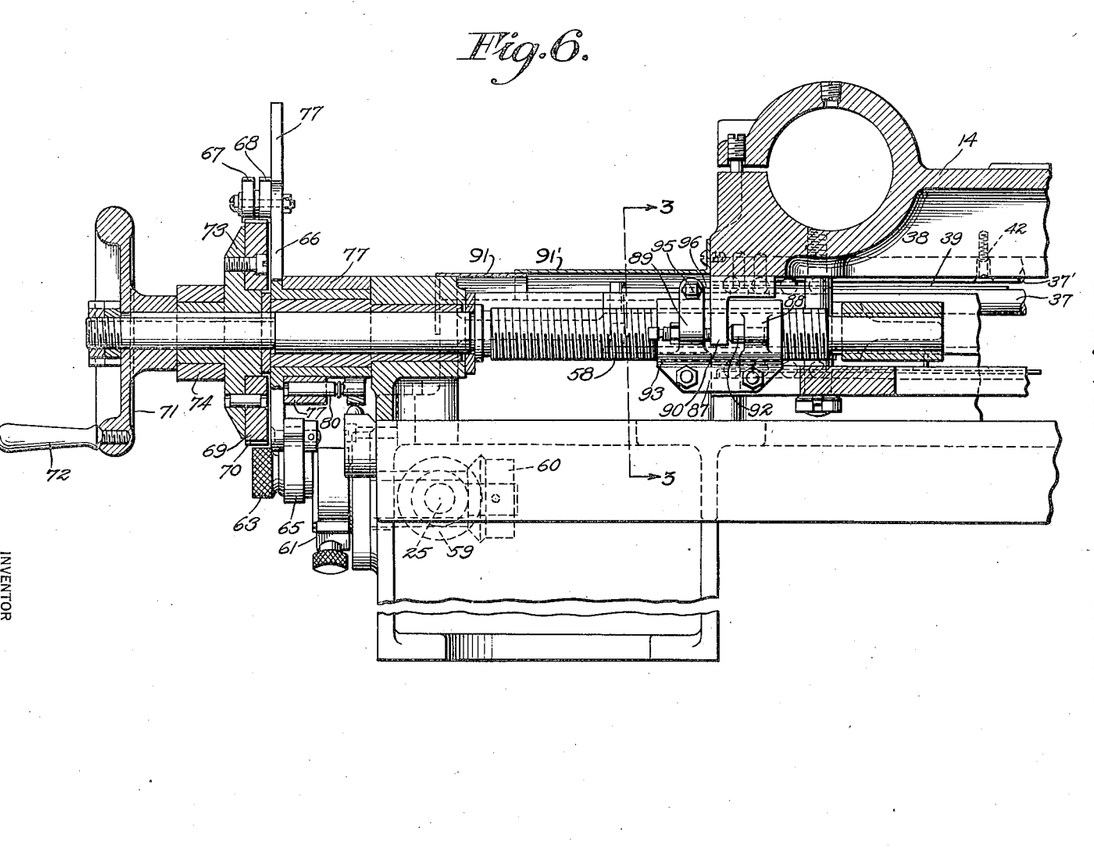
Fig. 6 is an elevational section taken substantially along the axis of the feed screw for the grinding wheel carriage.

As is clearly shown in Figs. 3, 5 and 6, the traveling nut 87 is provided with two pairs of spaced apart ears 88 and 89 on opposite sides of the axis of screw 58 and the downwardly extending projections 90 from carriage 14 lie between the ears of the respective pairs. Each ear 88 carries a fixed pin 92 having a flat face that bears against the respectively adjacent projection 90 and each ear 89 has threadedly engaged with it a screw 93 likewise having a flat end that is sent up against the projection 90 with a firm, but not frictionally binding, contact. This results in a positive drive of the carriage without any lost motion longitudinally of the screw 58 but permits the projections 90 to move between the pins 92 and screws 93, transversely of screw 58, to compensate for any warping of screw 58. Nut 87 is prevented from rotating with screw 58 by a pin 94 and a screw 95 that bear upon a member 96 fixed in a projection 97 on the carriage 14.

Figures 1, 8:
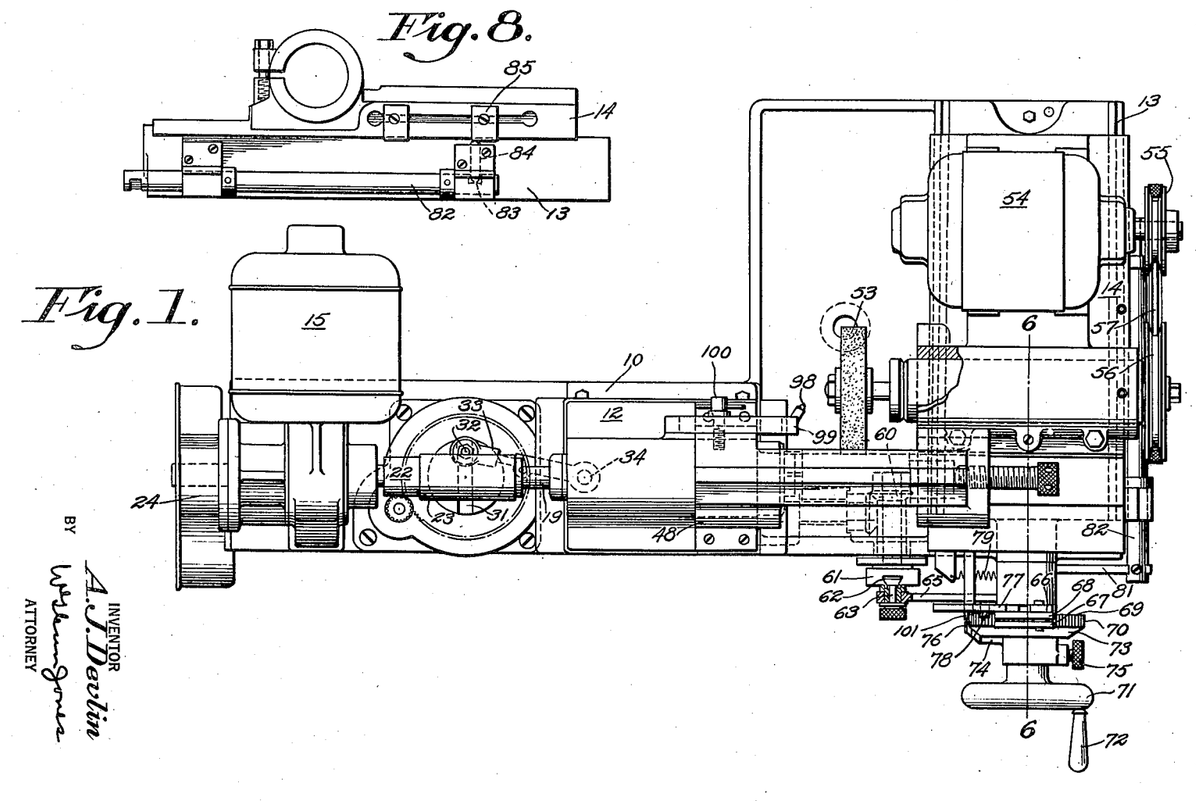
Fig. 1 is a top plan view of my novel grinding machine.
Fig. 8 is a detailed elevational view of the mechanism controlled by the position of the grinding wheel carriage to throw out one of the feed pawls.

Owing to differences in the hardness and structure of abrasive wheels, the grinding faces of such wheels require dressing and trueing at intervals. I show in Fig. 1 a means for trueing the face of the wheel 53 to insure that the said face will be transversely flat and a line on such face parallel to the axis of the wheel will be accurately parallel to the axis of work spindle 19. The dressing tool 98, preferably a diamond of a type well known in the art, is mounted on a tool holder 99 adjustably fixed to carriage 12 by means of a clamping screw 100. When wheel 53 is to be dressed, the tool holder 99 is adjusted to the right, as seen in Fig. 1, so that reciprocation of carriage 12 will cause the tool 98 to move back and forth across the wheel 53 and the wheel 53 is revolved in contact with tool 98 for a sufficient time to dress the face of wheel 53.

When a lens is to be ground it is attached to a chuck in any manner known in the art and the chuck is engaged with the driving spindle 19. Inasmuch as the details of these parts are old and well known no further description is deemed necessary. Hand wheel 71 is operated to traverse carriage 14 and bring grinding wheel 53 into contact with the edge of the lens blank. The operator, having measured the blank and knowing how much material has to be removed to reduce the blank to the desired size, adjusts the dog 85 to permit the carriage 14 to move toward the work approximately the required distance and the feed stop arm 74 is set to throw out the pawl 67 shortly after pawl 68 has been rendered inoperative by the action of dog 85 and the mechanism operated thereby.

When the feed screw has been stopped after the completion of the preliminary grinding, the operator measures the blank with a micrometer and sets the feed stop arm 74 a sufficient number of graduation devices on dial 73 to permit the carriage 14 to be traversed the necessary distance to reduce the lens blank accurately to size. In this final grinding operation, the pawl 68 is held disengaged by connection with arm 77 and consequently when portion 76 of arm 74 rides under pawl 67 the feed screw is stopped. A shield, comprising the telescoping members 91 and 91', protects screw 58 from material abraded by wheel 53 and from other dirt.

The distance travelled by carriage 12 in its reciprocating movement is varied by changing the position of crank pin 32. If a single lens is to be ground at one operation the pin 32 is set relatively close to the center of the gear 30 and if a plurality of lenses are to be ground simultaneously the position of pin 32 is adjusted to give the requisite length of travel to carriage 12 to traverse all the lenses across the face of abrasive wheel 53. It is apparent that, since the attention of the operator is required at intervals only, one operator may handle several machines instead of an operator being required for each machine as is necessary with the prior art devices.

The invention herein described and claimed may be used and/or manufactured by or for the Government of the United States of America for governmental purposes without the payment of any royalties thereon or therefor.

I claim:

1. A precision grinding machine, comprising a first bed, a first reciprocable carriage; anti-friction guideways for mounting said carriage on said bed including a pair of accurately cylindrical hard members parallel to and somewhat spaced from each other carried by one side of said bed, a plurality of hard balls of uniform size contacting both said members and retained spaced from each other, a like pair of hard cylindrical members carried by said carriage and resting upon said balls, a second pair of like hard cylindrical members carried by the other side of said bed, hard balls retained in spaced relation with each other contacting said second pair of cylindrical members, and a hardened track member carried by the other side of said carriage contacting the hard balls at the other side of said bed; a work-piece holding spindle rotatably mounted in said carriage and driving means connected to rotate said spindle and reciprocate said carriage; a second bed at right angles to said first bed, a second reciprocable carriage, and anti-friction guideways as above described whereby said second carriage is mounted on said second bed, an abrasive wheel rotatably mounted on said second carriage to operate upon a work piece carried by said spindle, means to drive said abrasive wheel, a feed screw mounted in said second bed connected to said second carriage to traverse said second carriage on said second bed, means actuated by said spindle driving means to rotate said feed screw, and automatic means to arrest the rotation of said feed screw including an instrumentality operated by said second carriage at a predetermined point in the traversing movement of said second carriage and a second instrumentality operated by said feed screw at a predetermined angular position of said feed screw, the simultaneous functioning of both said instrumentalities being required to arrest the rotation of said feed screw.

2. A precision grinding machine, comprising a first bed, a first carriage reciprocably mounted thereon, a work-piece holding spindle rotatably mounted in said carriage, a device connected to drive said spindle and reciprocate said carriage; a second bed, a second carriage reciprocably mounted thereon, a feed screw rotatably mounted in said second bed, means connecting said screw to said second carriage, an abrasive wheel rotatably mounted on said second carriage to operate upon a work-piece carried by said spindle; a disk fixedly connected to said screw and having accurately spaced peripheral ratchet teeth, an oscillatable feed lever mounted adjacent said disk, two pawls pivoted to said lever to be engageable with said teeth, means connecting said lever to said driving device to oscillate said lever, a feed stop arm fixable to rotate with said disk and having a portion to render one said pawl inoperative at a selected point in the rotation of said disk, a rockable kick-out arm having a portion to render the other said pawl inoperative when said kick-out arm is in one position, a spring connected to move said kick-out arm to said one position, a shaft rockably mounted in said second bed, a latch fixed to said shaft engageable with said kick-out arm to hold said kick-out arm in another position, said shaft having in it a recess laterally offset from the axis of said shaft, a pin bearing on the bottom of said recess, a dog on said second carriage to engage said pin and rock said shaft to disengage said latch from said kick-out arm at a predetermined point in the traverse of said second carriage, and means mounted on said second carriage to drive said abrasive wheel.

3. A precision grinding machine, comprising a first bed, a first carriage reciprocably mounted thereon, a work-piece holding spindle rotatably mounted in said carriage, a device connected to drive said spindle and reciprocate said carriage; a second bed, a second carriage reciprocably mounted thereon, a feed screw rotatably mounted in said second bed, means connecting said screw to said second carriage, an abrasive wheel rotatably mounted on said second carriage to operate upon a work-piece carried by said spindle; a disk fixedly connected to said screw and having accurately spaced peripheral ratchet teeth, an oscillatable feed lever mounted adjacent said disk, two pawls pivoted to said lever to be engageable with said teeth, means connecting said lever to said driving device to oscillate said lever, a feed stop arm fixable to rotate with said disk and having a portion to render one said pawl inoperative at a selected point in the rotation of said disk, a rockable kick-out arm having a portion to render the other said pawl inoperative when said kick-out arm is in one position, a spring connected to move said kick-out arm to said one position, a shaft rockably mounted in said second bed, a swingable latch engageable with said kick-out arm to hold said kick-out arm in another position, and means including an element mounted on said second carriage to disengage said latch from said kick-out arm at a predetermined point in the traverse of said second carriage.

4. A precision grinding machine, comprising a first bed, a first carriage reciprocably mounted thereon, a work-piece holding spindle rotatably mounted in said carriage, a device connected to drive said spindle and reciprocate said carriage; a second bed, a second carriage reciprocably mounted thereon, a feed screw rotatably mounted in said second bed, means connecting said screw to said second carriage, an abrasive wheel rotatably mounted on said second carriage to operate upon a work-piece carried by said spindle; a disk fixedly connected to said screw and having accurately spaced peripheral ratchet teeth, an oscillatable feed lever mounted adjacent said disk, two pawls pivoted to said lever to be engageable with said teeth, means connecting said lever to said driving device to oscillate said lever, a feed stop arm fixable to rotate with said disk and having a portion to render one said pawl inoperative at a selected point in the rotation of said disk, a rockable kick-out arm having a portion to render the other said powl inoperative when said kick-out arm is in one position, a spring connected to move said kick-out arm to said one position, a shaft rockably mounted in said second bed, means engageable with said kick-out arm to hold said kick-out arm away from said one position, and means including an element mounted on said second carriage to disengage said holding means at a predetermined point in the traverse of said second carriage.

5. In a precision grinding machine, a bed, a carriage, anti-friction guideways whereby said carriage is reciprocably mounted on said bed, a feed screw rotatably mounted in said bed, a travelling nut on said screw, means connecting said nut to said carriage to permit relative movement between said nut and said carriage transversely of the axis of said screw while preventing lost motion therebetween parallel to said axis, a wheel having ratchet teeth drivingly connected to said screw, an oscillatable feed lever mounted adjacent said wheel, two pawls pivoted to said lever to engage said teeth, driving means to oscillate said lever, a feed stop arm fixable to rotate with said wheel and having a portion to render one said pawl inoperative at a selected point in the rotation of said wheel, a rockable kick-out arm having a portion to render the other said pawl inoperative in one position of said kick-out arm, a spring connected to move said kick-out arm to said one position, a shaft rockably mounted in said bed, a latch fixed to said shaft engageable with said kick-out arm to hold said kick-out arm in another position, said shaft having in it a recess laterally offset from the axis of said shaft, a pin bearing on the bottom of said recess, a dog on said carriage to engage said pin and rock said shaft to disengage said latch from said kick-out arm at a predetermined point in the traverse of said carriage, and means to drive said abrasive wheel.

6. In a precision grinding machine, a bed, a carriage, anti-friction guideways whereby said carriage is reciprocably mounted on said bed, a feed screw rotatably mounted in said bed, a travelling nut on said screw, means connecting said nut to said carriage to permit relative movement between said nut and said carriage transversely of the axis of said screw while preventing lost motion therebetween parallel to said axis, a wheel having ratchet teeth drivingly connected to said screw, an oscillatable feed lever mounted adjacent said wheel, two pawls pivoted to said lever to engage said teeth, driving means to oscillate said lever, a feed stop arm fixable to rotate with said wheel and having a portion to render one said pawl inoperative at a selected point in the rotation of said wheel, a rockable kick-out arm having a portion to render the other said pawl inoperative in one position of said kick-out arm, a spring connected to move said kick-out arm to said one position, means engageable with said kick-out arm to hold said kick-out arm away from said one position, and means including an element mounted on said carriage to disengage said holding means at a predetermined point in the traverse of said carriage.

7. In a precision grinding machine, a bed, a carriage, anti-friction guideways whereby said carriage is reciprocably mounted on said bed, a feed screw rotatably mounted in said bed, a travelling nut on said screw, means connecting said nut to said carriage to permit relative movement between said nut and said carriage transversely of the axis of said screw while preventing lost motion therebetween parallel to said axis, a wheel having ratchet teeth drivingly connected to said screw, an oscillatable feed lever mounted adjacent said wheel, two pawls pivoted to said lever to engage said teeth, driving means to oscillate said lever, means carried by said ratchet wheel to render one said pawl temporarily inoperative at a predetermined point in the rotation of said wheel, and means including an element mounted on said carriage to render the other said pawl inoperative, until manually reset, at a predetermined point in the traverse of said carriage.

8. A machine as described, comprising a rotatably and reciprocably mounted work-piece holding spindle, mechanism to rotate and reciprocate said spindle, a carriage mounted for traversing movement toward a piece of work held by said spindle, an abrasive wheel rotatably mounted on said carriage and positioned to operate on a work-piece held by said spindle, means to drive said wheel, feed means to move said wheel toward said work at a predetermined rate, means drivingly connecting said feed means to said mechanism; and means to arrest operation of said feeding means while said mechanism continues to operate, said arresting means including a mechanical train actuated at a predetermined point in the travel of said carriage and a device functioning at a predetermined position of said feeding means, the simultaneous action of both said train and said device being required to arrest operation of said feeding means.

9. In a precision machine having a bed and a carriage, anti-friction guideways whereby said carriage is reciprocably mounted on said bed comprising a pair of accurately cylindrical hard members parallel to and slightly spaced from each other carried by one side of said bed, a like pair of members carried by the same side of said carriage, a plurality of hard balls disposed between the members of each pair and between said two pairs, a second pair of like cylindrical members carried by the other side of said bed parallel to said first-mentioned pair, a plurality of hard balls disposed between the members of said second pair, a removable hardened track member carried by the other side of said carriage to ride upon the balls between said second pair of cylindrical members, and means to prevent upward displacement of said carriage during operation of said machine.

10. In a precision machine having a bed and a carriage of considerable weight, an anti-friction guideway for reciprocably mounting said carriage upon said bed comprising a pair of accurately cylindrical hard members parallel to and slightly spaced from each other carried by said bed, a like pair of cylindrical members carried by said carriage, and a plurality of hard balls disposed between the members of each pair and between said pairs, said cylindrical members being adjustable about their longitudinal axes to present new contact areas to said balls.

11. In a precision machine having a bed and a carriage of considerable weight, anti-friction guideway for reciprocably mounting said carriage upon said bed comprising a pair of accurately cylindrical hard members parallel to and slightly spaced from each other carried by said bed, a plurality of hard balls disposed between said members, and a hardened track member carried by said carriage to ride upon said balls, said cylindrical members being adjustable about their longitudinal axes to present new contact areas to said balls.

12. In a machine having a bed and a carriage traversable thereon, a feed screw rotatably mounted in said bed, said carriage having a projection extending down on each side of said screw and said projections being transversely alined, a travelling nut threadedly engaging said screw, two pairs of ears on said nut so positioned that a respective one of said projections lies between the ears of each said pair, a fixed pin carried by one ear of each pair extending toward the respectively adjacent projection and an adjustable screw carried by the other ear of each pair, whereby each said projection is held between a fixed pin and an adjustable screw with positive but not frictionally binding contact to permit relative movement between said carriage and said nut transversely of said screw while preventing lost motion between said projections and said nut, and positive but not frictionally binding means connecting said nut to said carriage to prevent rotation of said nut with said screw.

13. In a machine having a bed and a carriage traversable thereon, a feed screw rotatably mounted in said bed, said carriage having a projection extending down on each side of said screw and said projections being transversely alined, a travelling nut threadedly engaging said screw, means drivingly connecting said nut to said projections to permit relative movement between said nut and said carriage transversely of said screw while preventing lost motion between said nut and said projections longitudinally of said screw, and means connecting said nut to said carriage to permit relative movement between said nut and said carriage transversely of said screw while preventing rotation of said nut with said screw.

14. A grinding machine, comprising a reciprocably and rotatably mounted work-piece holding spindle, a reciprocable carriage, a grinding device carried by said carriage to operate upon a work-piece carried by said spindle, a feed screw, means drivingly connecting said carriage to said screw, said connecting means permitting relative movement between said screw and said carriage transversely of said screw while preventing lost motion longitudinally of said screw, means to rotate said screw, and means to arrest operation of said screw rotating means controlled jointly by the position of said carriage in its travel and by the angular position of said feed screw.

15. In a precision machine having a bed and a carriage accurately slidable thereon, a rotatable screw mounted to prevent longitudial movement of said screw, a travelling nut on said screw, and means drivingly connecting said nut and said carriage to permit relative movement between said nut and said carriage transversely of said screw while preventing lost motion between said nut and said carriage.

ARTHUR J. DEVLIN.